United States Patent
Chaiken et al.

(10) Patent No.: US 10,514,972 B2
(45) Date of Patent: Dec. 24, 2019

(54) EMBEDDING FORENSIC AND TRIAGE DATA IN MEMORY DUMPS

(71) Applicant: Dell Products L. P., Round Rock, TX (US)

(72) Inventors: Craig Lawrence Chaiken, Pflugerville, TX (US); Michael Wayne Arms, Pflugerville, TX (US)

(73) Assignee: Dell Products L. P., Round Rock, TX (US)

(*) Notice: Subject to any disclaimer, the term of this patent is extended or adjusted under 35 U.S.C. 154(b) by 96 days.

(21) Appl. No.: 15/964,265

(22) Filed: Apr. 27, 2018

(65) Prior Publication Data

US 2019/0332461 A1 Oct. 31, 2019

(51) Int. Cl.
*G06F 11/00* (2006.01)
*G06F 11/07* (2006.01)

(52) U.S. Cl.
CPC ........ *G06F 11/0778* (2013.01); *G06F 11/006* (2013.01); *G06F 11/079* (2013.01); *G06F 11/0745* (2013.01); *G06F 11/0754* (2013.01)

(58) Field of Classification Search
CPC .. G06F 11/0778; G06F 11/006; G06F 11/079; G06F 11/0745; G06F 11/0754; G06F 11/0787; G06F 11/3476; G06F 21/554; G06F 21/55; G06F 21/6281; H04L 63/1416
USPC ...................................................... 714/38.11
See application file for complete search history.

(56) References Cited

U.S. PATENT DOCUMENTS

| | | | | |
|---|---|---|---|---|
| 5,630,050 A | * | 5/1997 | Neuhard | G06F 11/07 714/27 |
| 8,645,763 B2 | * | 2/2014 | Szegedi | G06F 21/6254 714/38.11 |
| 8,762,790 B2 | * | 6/2014 | McCoy | G06F 11/079 714/45 |
| 9,141,463 B2 | * | 9/2015 | Nishiyama | G06F 11/079 |
| 9,524,389 B1 | * | 12/2016 | Roth | G06F 21/554 |
| 10,114,731 B2 | * | 10/2018 | Fan | G06F 11/366 |
| 2009/0164740 A1 | * | 6/2009 | Choi | G06F 11/0715 711/158 |
| 2015/0106661 A1 | * | 4/2015 | Cardona | G06F 11/0721 714/45 |

* cited by examiner

*Primary Examiner* — Jason B Bryan
*Assistant Examiner* — Matthew N Putaraksa
(74) *Attorney, Agent, or Firm* — Campbell Stephenson LLP; Shiv S. Naimpally

(57) ABSTRACT

Disclosed herein are methods, systems, and processes to embed forensic and triage data in memory dumps. Memory dump data being written to kernel memory of a computing system by a firmware interface is detected. An operating mode of an operating system executing on the computing system is activated. Hardware forensic data is generated by reading local computer bus data, firmware event log data, and memory mapped input/output (I/O) data associated with the computing system. The hardware forensic data is then stored in a memory location of the kernel memory, causing the hardware forensic data to be included in the memory dump data being written to kernel memory.

20 Claims, 6 Drawing Sheets

US 10,514,972 B2

EMBEDDING FORENSIC AND TRIAGE DATA IN MEMORY DUMPS

FIELD OF THE DISCLOSURE

This disclosure is related to the debugging of computing systems. In particular, this disclosure is related to embedding forensic and triage data in memory dumps.

DESCRIPTION OF THE RELATED ART

A memory dump is a process in which the contents of memory are displayed and stored in case of an application or system crash. A memory dump helps developers and administrators to diagnose, identify, and resolve problems that led to the application or system failure. A memory dump is also known as a core dump and blue screen of death (BSOD) in Windows®-based computing systems.

A memory dump primarily identifies a problem or error within the operating system (OS) or one or more installed applications within the computing system. Typically, a memory dump provides information about the last state of the programs, applications, hardware, firmware, and the like, before they terminated and/or crashed. Memory dump information includes memory locations, program counters, program state, and other related details. This information can be displayed on-screen and can also be stored in a system log file for later viewing and/or referencing. After a memory dump, a computing system is generally unavailable or inaccessible until it is rebooted.

Certain memory dumps do not include the hardware state data or Non-Volatile Random Access Memory (NVRAM) data required to debug a hardware or Basic Input/Output System (BIOS) induced failure, requiring the debugging of these failures via a live debugging session. Unfortunately, in such situations, effectively capturing memory dump information on-premises in a proactive and real-time fashion presents several technology-related challenges.

SUMMARY OF THE DISCLOSURE

Disclosed herein are methods, systems, and processes to embed forensic and triage data in memory dumps. One such method involves detecting that a firmware interface is writing memory dump data to kernel memory of a computing system, and based on the detecting, activating an operating mode of an operating system executing on the computing system. The method also includes generating hardware forensic data by reading local computer bus data, firmware event log data, and memory mapped input/output (I/O) data associated with the computing system, and storing the hardware forensic data in a memory location of the kernel memory causing the hardware forensic data to be included in the memory dump data.

In one embodiment, firmware interface is a Unified Extensible Firmware Interface (UEFI), the operating mode is a System Management Mode (SMM), the local computer bus data is associated with a Peripheral Component Interconnect (PCI) of the computing system, and the firmware event log is a Basic Input/Output System (BIOS) log.

In another embodiment, the method involves generating thermal data that includes a current temperature of one or more thermistors in the computing system, and generating Non-Volatile Random Access Memory (NVRAM) data that includes a last configuration created by a memory reference code.

In some embodiments, the local computer bus data includes one or more Peripheral Component Interconnect Express (PCIE) registers for one or more PCIE bridges of the computing system and indicates whether one or more PCI devices have gone offline, and the memory mapped I/O data includes information associated with storage controllers and Universal Serial Bus (USB) devices of the computing system and indicates whether the storage controllers or the USB devices have gone offline or into an error state.

In another embodiments, the method involves parsing the hardware forensic data prior to causing the inclusion of the hardware forensic data in the memory dump data. In this example, the parsing includes determining whether a machine check is active, whether a boot device went offline, whether a PCIE bridge has an error or has gone offline, whether a storage controller is in an errant state, and/or whether a thermal sensor is at or within a threshold of a critical level.

In certain embodiments, based on the parsing, the method involves generating hardware failure data, and storing the hardware triage data in the memory location along with the hardware forensic data for inclusion in the memory dump data.

In one embodiment, detecting that the firmware interface is writing the memory dump data to the kernel memory includes determining whether the NVRAM variable associated with a kernel debugger is being written to, and calling a software System Management Interrupt (SMI) associated with the SMM to write the hardware failure triage data and the hardware forensic data to an Advanced Configuration and Power Interface (ACPI) memory structure in the kernel memory.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
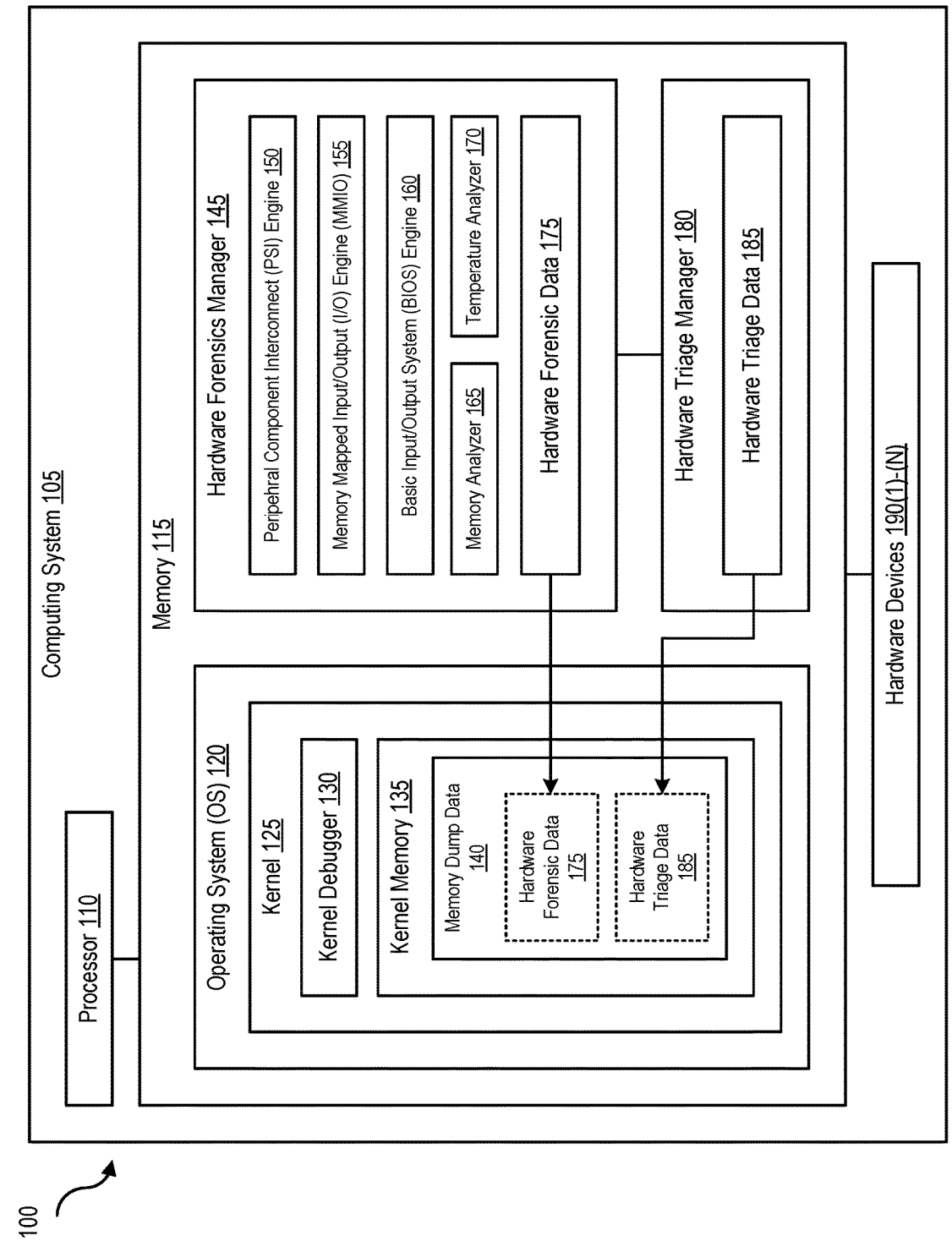
FIG. 1 is a block diagram 100 of a computing system that embeds forensic and triage data in memory dumps, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A memory dump (e.g., a Windows® memory dump) is a valuable tool for analyzing software failures involving the operating system (OS) kernel, drivers, and/or applications. The memory dump contains information that permits the debugging of software failures offline without access to the failing and/or failed computer. A significant percentage of such failures are hardware and/or Basic Input/Output System (BIOS) induced failures, where the underlying cause of the software failure is a hardware induced failure or a BIOS induced failure. Therefore, such failures require debugging to be performed via a live debugging session.

Unfortunately, live debugging sessions face several limitations. First, live debugging sessions generally cannot be performed on-premises (e.g., at a customer's site on in the customer's computing environment). For example, logistical and/or security-related concerns typically prevent the performance of live debugging sessions on-premises and in real-time. Second, enabling debugging might prevent the failure from occurring. For example, because certain failures are time sensitive, sequences of computing events have to take place in a specific order and/or at a specific time for the failure to occur. Therefore, there is a significant risk that the failure may not reproduce—not because the failure has been rectified, but because the timing and sequence of necessary computing events do not align. In addition, because certain other failures only occur in specific computing environments (e.g., in conjunction with a certain wireless router at the customer's office, and the like), removal of the failed computing system out of the operational environment may cause the failure to not reproduce. Therefore, in such situations, the risk of not reproducing the failure is significant. Third, receiving the failed hardware for debugging purposes requires slow shipping and the risk of not reproducing the failure after receiving the failed computing system. For example, removing the failed computing system or one or more hardware components thereof (e.g., hard disk drives (HDDs) and the like) from premises causes significant business-related interruptions.

Disclosed herein are methods, systems, and processes to embed hardware-related forensic and triage data in memory dumps in a proactive and real-time manner.

Example Computing System to Embed Forensic and Triage Data in Memory Dumps

FIG. 1 is a block diagram 100 of a computing system that embeds forensic and triage data in memory dumps, according to one embodiment. As shown in FIG. 1, computing system 105 includes at least a processor 110 and a memory 115. Memory 115 includes at least an operating system (OS) 120, a hardware forensics manager 145, and a hardware triage manager 180. Computing system 105 also includes hardware devices 190(1)-(N) which are accessible by OS 120 via a firmware interface like Unified Extensible Firmware Interface (UEFI) that provides a software interface between OS 120 and platform firmware. Computing device 105 can be any type of computing device (e.g., a desktop, a laptop, a mobile computing device such as a tablet or a smartphone, a server, and the like).

OS 120 can be any type of operating system (e.g., Windows®, Linux®, and the like), and includes at least a kernel 125. Kernel 125 includes at least a kernel debugger 130 and a kernel memory 135. Kernel memory 135 further includes at least memory dump data 140. In this example, memory dump data 140 includes at least two types data and/or information: hardware forensic data 175 and hardware triage data 185. Kernel debugger 125 is a computer program used to test and debug other programs (e.g., the "target" program) that is included in kernel 125 (e.g., to ease debugging and kernel development). Kernel debugger 125 can be a stud implementing low-level operations, with a full debugger (e.g., GNU Debugger (GDB)), running on another computing system, sending commands to the stud over a network interconnection, or it might provide a command that can be used directly on computing device 105 (e.g., the machine being debugged).

Kernel memory 135 is reserved for parts of OS 120 that have to stay in memory and is memory used by kernel 125. Kernel memory 135 includes core components of OS 120 along with device drivers, and the like. As shown in FIG. 1, kernel memory 135 can also store memory dump information (e.g., kernel memory dump data 140) associated with computing device 105. However, memory dump data 140 in remotely-executed memory dumps of computing systems that do not implement hardware forensics manager 145 and hardware triage manager 180 does not include hardware forensic data 175 and hardware triage data 185.

Hardware forensics manager 145 includes at least a Peripheral Component Interconnect (PCI) engine 150, a Memory Mapped Input/Output (MMIO) engine 155, a Basic Input/Output System (BIOS) engine 160, a memory analyzer 165, and a temperature analyzer 170. Hardware forensics manager 145 also identifies, retrieves, and/or generates hardware forensics data 175 using at least PCI engine 150, MMIO engine 155, BIOS engine 160, memory analyzer 165 and temperature analyzer 170.

PCI engine 150 identifies, generates, retrieves, and/or formats PCI data associated with one or more hardware devices 190(1)-(N) coupled to computing device 105 via Conventional PCI or PCI express (PCIe) (e.g., via a local computer bus, a serial computer expansion bus, and the like). MMIO engine 155 identifies, generates, retrieves, and/or formats MMIO data transmitted between processor 110 and peripheral devices operating on computing device 105 by intercepting input/output (I/Os) between processor 110 and the peripheral devices (e.g., input devices, output devices, and input/output devices like a Universal Serial Bus (USB) device, memory card, and the like). BIOS engine 160 identifies, generates, retrieves, and/or formats BIOS data in computing device 105 (e.g., data associated with non-volatile firmware used to perform hardware initialization during the booting process and/or provide runtime services for OS 120 and other programs).

In addition to PCI engine 150, MMIO engine 155 and BIOS engine 160, hardware forensics manager 145 also generates hardware forensics data 175 using memory analyzer 165 and temperature analyzer 170. Memory analyzer 165 identifies, generates, retrieves, and/or formats a last configuration loaded by a memory reference code and includes memory data that can be used to diagnose and rectify memory related failures. Temperature analyzer 170 identifies, generates, retrieves, and/or formats current temperature(s) associated with one or more thermistors in computing device 105 (e.g., types of resistors whose resistance is dependent on temperature). Therefore, as shown in FIG. 1, PCI engine 150, MMIO engine 155, and BIOS engine 160, in conjunction with memory analyzer 165 and temperature analyzer 170 can be used by hardware forensics manager 145 to generate hardware forensics data 175 for inclusion in (as part of) memory dump data 140 (e.g., in kernel memory 140). Hardware triage manager 180 analyzes hardware forensics data 175 and generates hardware triage data 185.

In one embodiment, hardware forensics manager 145 detects that a firmware interface (e.g., UEFI, and the like) is writing memory dump data (e.g., memory dump data 140) to kernel memory (e.g., kernel memory 135), for example, as part of one or more ongoing debugging operations being performed on computing device 105. Based on the detecting, hardware forensics manager 145 actives an operating mode of OS 120 executing on computing device 105 (e.g., System Management Mode (SMM)), generates hardware forensic data 175 by reading local computer bus data (e.g., using PCI engine 150), firmware event log data (e.g., a BIOS log generated and maintained by BIOS engine 160), and MMIO data (e.g., using MMIO engine 155) associated with computing device 105. Hardware forensics manager 145 then stores hardware forensics data 175 in a memory location (e.g., the location of memory dump data 140) of kernel memory 135 causing hardware forensics data 175 to be included in memory dump data 140 (e.g., as part of the debugging operation).

In another embodiment, temperature analyzer 170 generates thermal data that includes a current temperature of one or more thermistors in computing device 105. Memory analyzer 165 generates Non-Volatile Random Access Memory (NVRAM) data that includes a last configuration created by a memory reference code. In the foregoing examples, PCI data, MMIO data, BIOS data, memory data, and/or temperature data can be formatted by hardware forensics manager 145 to be stored in a table format (e.g., in rows and/or columns) or can be stored by hardware forensics manager 145 as raw data. In either case, hardware forensics manager 145 causes inclusion of hardware forensics data 175 in kernel memory 135 (e.g., upon generation of hardware forensics data 175 and/or upon detection of an ongoing debugging operation being performed on computing device 105, writing hardware forensics data 175 from memory 115 to kernel memory 135, to be stored as part of memory dump data 140).

In certain embodiments, the local computer bus data generated by PCI engine 150 includes one or more PCIe registers of one of more PCIe bridges of computing device 105 and indicates whether one or more PCIe devices associated with computing device 105 have gone offline, and the MMIO data generated by MMIO engine 155 includes information and/or metadata associated with one or more storage controllers or one or more USB devices of computing device 105 and indicates whether the one or more storage controllers or the one or more USB devices have gone offline or into an error state.

In some embodiments, hardware triage manager 180 parses hardware forensic data 175 prior to causing inclusion of hardware forensic data 175 in memory dump data 140. This parsing process produces hardware triage data 185, which is included also in memory dump 140 by hardware triage manager 180. For example, parsing hardware forensic data 175 prior to causing inclusion of hardware forensic data 175 in memory dump data 140 by hardware triage manager 180 includes, but is not limited to, determining whether a machine check is active, determining whether a boot device went offline, determining whether a PCIe bridge has an error or has gone offline, and/or determining whether a thermal sensor is at within a threshold of a critical level. By doing so, hardware triage manager 180 analyzes hardware forensic data 175 generated by hardware forensic manager 145 to produce hardware triage data 180 that includes actionable data that can be used to diagnose and rectify hardware related problems associated with computing device 105 (e.g., by performing a root cause analysis).

Therefore, based on the parsing, hardware triage manager 180 generates hardware triage data 185 and stores hardware triage data 185 in the memory location (e.g., location of memory dump data 140 in kernel memory 135) along with hardware forensic data 175 for inclusion in memory dump data 140. In certain embodiments, detecting that a firmware interface (e.g., UEFI, and the like) is writing memory dump data 140 to kernel memory 135 includes determining whether the NVRAM variable associated with kernel debugger 130 is being written to and calling a System Management Interrupt (SMI) associated with the SMM to write hardware triage data 185 and hardware forensic data 175 to an Advanced Configuration and Power Interface (ACPI) memory structure in kernel memory 135 (e.g., a memory location of memory dump data 140, as shown in FIG. 1).

When a OS bug check occurs (e.g., a debugging operation), OS 120 writes at least three UEFI NVRAM variables to kernel memory 135 (e.g., BugCheckCode, BugCheckParameter1, and BugCheckProgress). Hardware forensics manager 145 modifies the UEFI NVRAM variable causing the UEFI NVRAM variable to call a SMI upon detection that OS 120 is writing to the BugCheckCode NVRAM variable. Hardware forensics manager 145 then causes the SMI to create one or more tables of hardware forensic data 175 and copies the one or more tables to kernel memory 135 that is automatically included in the OS kernel memory dump(s) (e.g., as memory dump data 140).

In the foregoing example, the one or more tables generated by hardware forensics manager 145 include PCIe configurations for PCIe bridges and their downstream devices to help diagnose PCIe device failures. One or more other tables include MMIO data for storage controllers and USB devices to determine whether the storage controller and/or USB devices have gone offline (or into error states). One or more tables also include BIOS event log messages to provide a history of platform failures, current temperature(s) of thermistors in computing device 105, and/or the last configuration loaded by the memory reference code.

After hardware forensics manager 145 generates tables (or raw data) of hardware forensics data 175, hardware triage manager 180 supplements hardware forensics data 175 with hardware triage data 180. Hardware triage manager 180 generates further information regarding hardware and BIOS failures from hardware forensics data 175 to create hardware triage data 185. For example, hardware triage manager 180 at least accesses PCIe bridges (e.g., to determine whether there are any recoverable or unrecoverable errors, or whether a connected device is not trained successfully), accesses MMIO for storage controllers (e.g., to determine whether one or more such devices were present at boot time offline), accesses USB devices (e.g., to determine whether any such devices are in an error state), and/or accesses Central Processing Unit (CPU) machine check registers (e.g., to determine whether there is an active machine check and to identify the device that caused the machine check). Hardware triage manager 180 then generates hardware triage data 185 from the triage analysis and adds hardware triage data 185 to a memory table that is saved to the memory dump.

As previously noted, a remotely-executed memory dump does not contain information about hardware errors in a computing system (e.g., hardware forensics data 175), particularly information associated with the specifics of such errors (e.g., hardware triage data 185). In certain embodiments, the foregoing methods, systems, and processes provide for a single OS memory dump file (e.g., memory dump data 140) that contains the forensic data necessary to debug a failing computing system without the need to physically capture the computing system, forensic data that includes information only known to the BIOS of the computing system (e.g., hardware forensic data 175). In addition, the memory dump includes BIOS-generated triage information up to and including the specific hardware failure that caused the failure (e.g., hardware triage data 185).

Example Processes to Embed Forensic and Triage Data in Memory Dumps

Figure 2:
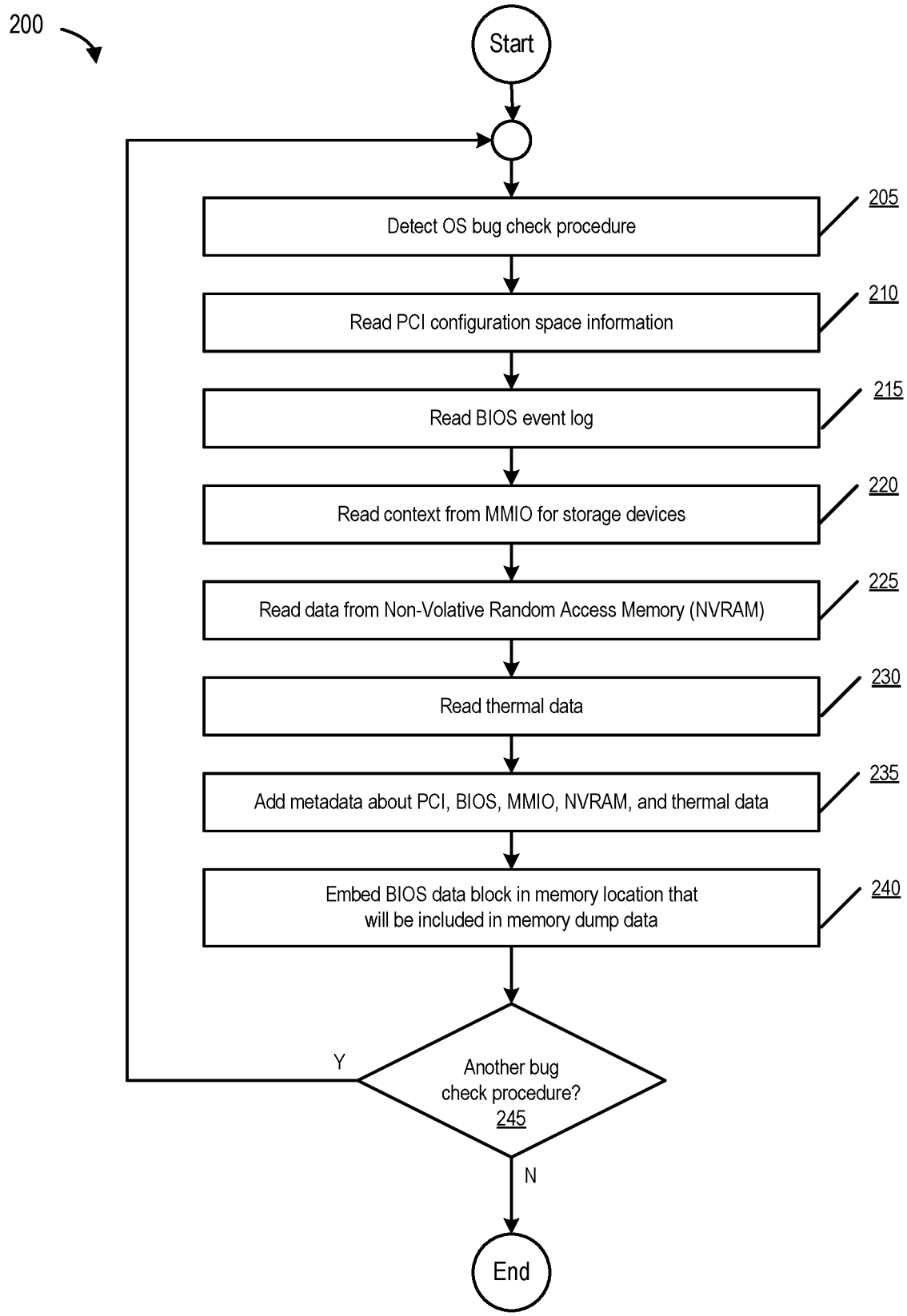
FIG. 2 is a flowchart 200 of a process for generating Basic Input/Output System (BIOS) data for a memory dump, according to one embodiment of the present disclosure.

FIG. 2 is a flowchart 200 of a process for generating Basic Input/Output System (BIOS) data for a memory dump, according to one embodiment. The process begins at 205 by detecting a bug check procedure (e.g., a debug operation being performed on computing device 105). At 210, the process reads PCI configuration space information (e.g., root bridges, PCI devices if they are not in an error state, listing of devices that are in an error state). At 215, the process reads a BIOS event log (e.g., using BIOS engine 160), and at 220, reads context from MMIO for storage devices (e.g., using MMIO engine 155).

At 225, the process reads data from NVRAM (e.g., as needed for system context), and at 230, reads thermal data (e.g., from thermistors as needed). At 235, the process adds metadata about PCI data, BIOS data, MMIO data, NVRAM data, and thermal data, and at 240, embeds the BIOS data block in the memory location that will be included in memory dump data (e.g., memory dump data 140). At 245, the process determines if there is another bug check procedure. If there is another bug check procedure, the process loops to 205. Otherwise, the process ends.

Figure 3:
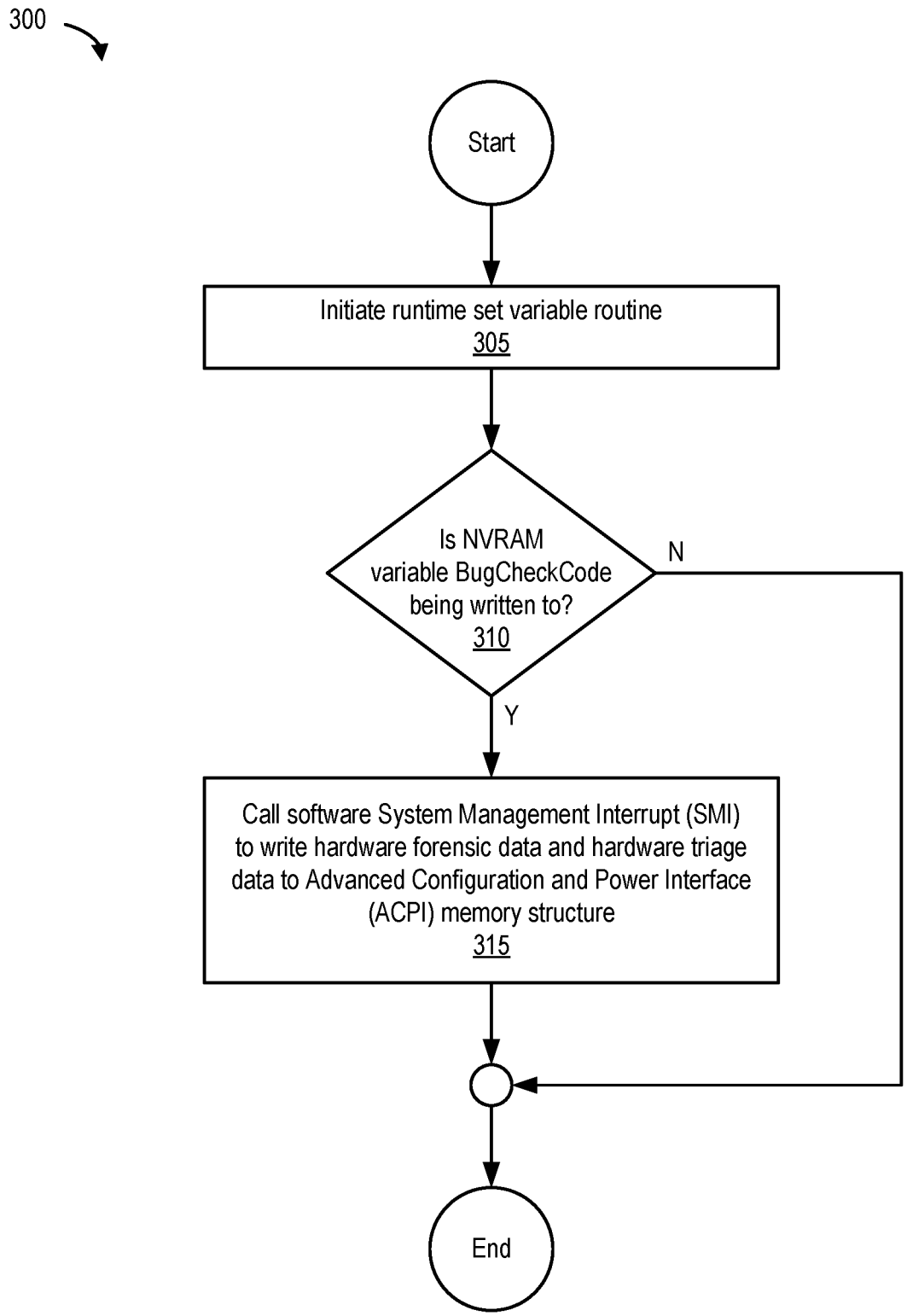
FIG. 3 is a flowchart 300 of a process for configuring changes to a runtime Driver Execution Environment (DXE) variable routine, according to one embodiment of the present disclosure.

FIG. 3 is a flowchart 300 of a process for configuring changes to a runtime Driver Execution Environment (DXE) variable routine, according to one embodiment. The process begins at 305 by initiating a runtime set variable routine. At 310, the process determines if the NVRAM variable BugCheckCode is being written to. If the NVRAM variable BugCheckCode is not being written to, the process ends. However, if the NVRAM variable BugCheckCode is being written to (e.g., by OS 120), the process ends at 315 by calling software SMI to write hardware forensic data 175 and hardware triage data 185 to an ACPI memory structure (e.g., in kernel memory 135, as shown in FIG. 1).

Figure 4:
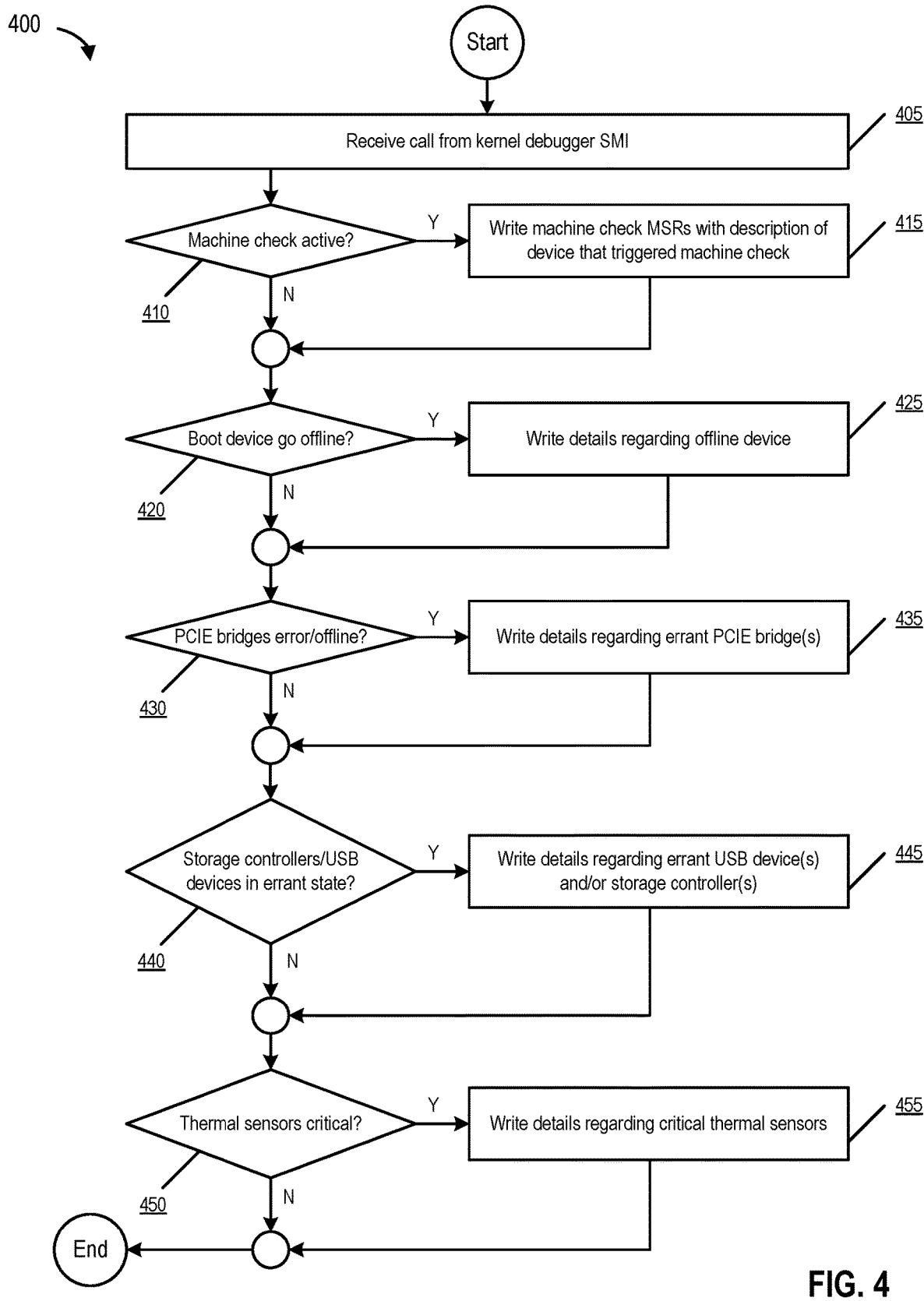
FIG. 4 is a flowchart 400 of a process for generating bug check hardware failure triage data, according to one embodiment of the present disclosure.

FIG. 4 is a flowchart 400 of a process for generating bug check hardware failure triage data, according to one embodiment. The process begins at 405 by receiving a call from a kernel debugger SMI. At 410, the process determines whether a machine check is active. If the machine check is active, the process, at 415, writes machine check Machine State Registers (MSRs) with a description of the device that caused the machine check. If the machine check is inactive, the process proceeds to 420.

At 420, the process determines whether a boot device went offline. If a boot device went offline, the process, at 425, writes details regarding the offline device. If the boot device did not go offline, the process proceeds to 430. At 430, the process determines whether PCIe bridges are in error and/or offline. If PCIe bridges are in error and/or offline, the process, at 435, writes details regarding errant PCIe bridges. If PCIe bridges are not in error and/or offline, the process proceeds to 440. At 440, the process determines whether storage controllers and/or USB devices are in an errant state. If the storage controllers and/or USB devices are in an errant state, the process, at 445, writes details regarding errant USB devices and/or storage controllers. If the storage controllers and/or USB devices are not in an errant state, the process proceeds to 450. At 450, the process determines if thermal sensors are critical. If the thermal sensors are critical, the process, at 455, writes details regarding critical thermal sensors. If the thermal sensors are not critical, the process ends.

Therefore, the methods, systems, and processes disclosed herein embed hardware-related forensic and triage data in memory dumps in a proactive and real-time manner.

Example Computing Environment

Figure 5:
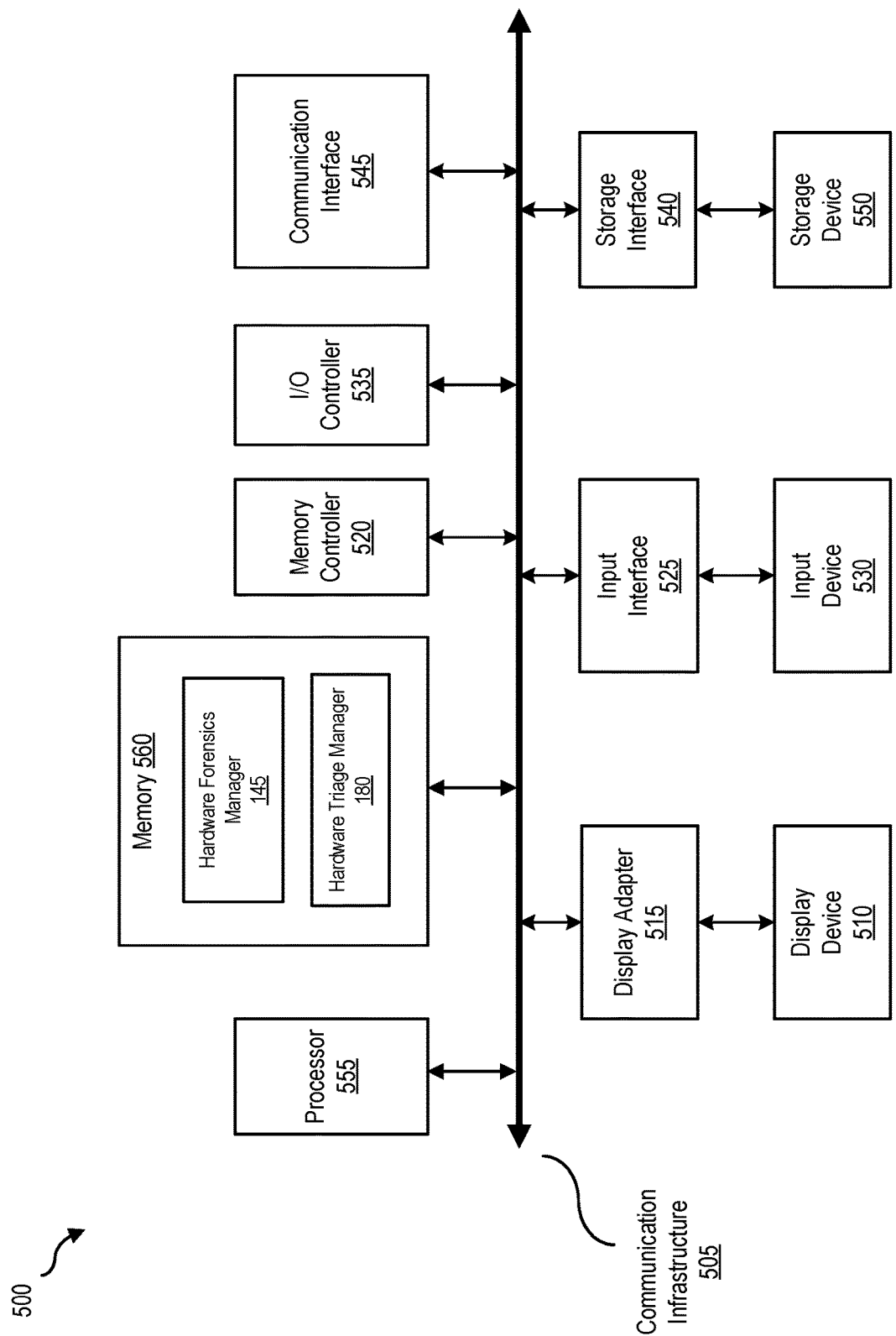
FIG. 5 is a block diagram 500 of a computing system, according to one embodiment of the present disclosure.

FIG. 5 is a block diagram 500 of a computing system, illustrating how a hardware forensics manager and/or a hardware triage manager can be implemented in software, according to one embodiment. Computing system 500 can includes computing system 105 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., mobile phones), network appliances, storage controllers (e.g., array controllers, tape drive controller, or hard drive controller), and the like. In its most basic configuration, computing system 500 may include at least one processor 555 (e.g., processor 110) and a memory 560 (e.g., memory 115). By executing the software that executes hardware forensics manager 145 and/or a hardware triage manager 180, computing system 500 becomes a special purpose computing device that is configured to embed forensic and triage data in memory dumps.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein. Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 500 may include both a volatile memory unit and a non-volatile storage device. In one example, program instructions implementing hardware forensics manager and/or a hardware triage manager may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein.

I/O controller 535 generally represents any type or form of module capable of coordinating and/or controlling the input and output functions of an appliance and/or a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type or form of communication device or adapter capable of facilitating communication between computing system 500 and one or more other devices. Communication interface 545 may facilitate communication between computing system 500 and a private or public network including additional computing systems. Examples of communication interface 545 include, without limitation, a wired network interface (such as a network interface card), a wireless network interface (such as a wireless network interface card), a modem, and any other suitable interface. Communication interface 545 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 545 may also represent a host adapter configured to facilitate communication between computing system 500 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 545 may also allow computing system 500 to engage in distributed or remote computing (e.g., by receiving/sending instructions to/from a remote device for execution).

As illustrated in FIG. 5, computing system 500 may also include at least one display device 510 coupled to communication infrastructure 505 via a display adapter 515. Display device 510 generally represents any type or form of device capable of visually displaying information forwarded by display adapter 515. Similarly, display adapter 515 generally represents any type or form of device configured to forward graphics, text, and other data from communication infrastructure 505 (or from a frame buffer, as known in the art) for display on display device 510. Computing system 500 may also include at least one input device 530 coupled to communication infrastructure 505 via an input interface 725. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transferring and/or transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560 and/or various portions of storage device 550. When executed by processor 555, a computer program loaded into computing system 500 may cause processor 555 to perform and/or be a means for performing the functions of one or more of the embodiments described/illustrated herein. Additionally or alternatively, one or more of the embodiments described and/or illustrated herein may be implemented in firmware and/or hardware. For example, computing system 500 may be configured as an application specific integrated circuit (ASIC) adapted to implement one or more of the embodiments disclosed herein.

Example Networking Environment

Figure 6:
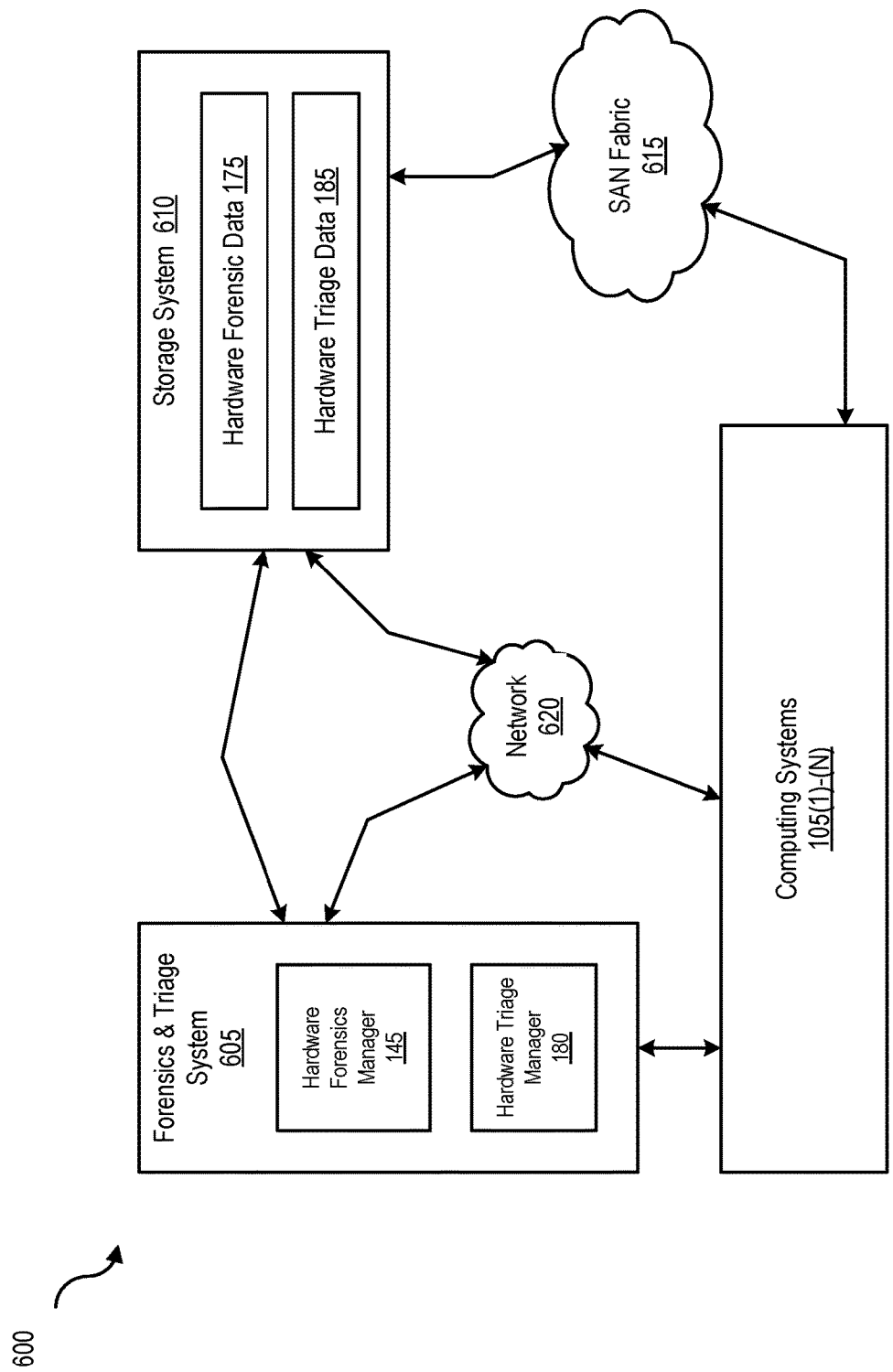
FIG. 6 is a block diagram 600 of a networked system, according to one embodiment of the present disclosure.

FIG. 6 is a block diagram of a networked system, illustrating how various computing devices can communicate via a network, according to one embodiment. In certain embodiments, network-attached storage (NAS) devices may be configured to communicate with computing system 105 using Network File System (NFS), Server Message Block (SMB), or Common Internet File System (CIFS). Network 620 generally represents any type or form of computer network or architecture capable of facilitating communication for computing system 105.

In certain embodiments, a communication interface, such as communication interface 545 in FIG. 5, may be used to provide connectivity between computing system 105 and network 620. The embodiments described and/or illustrated herein are not limited to the Internet or any particular network-based environment. In some embodiments, network 620 can be a Storage Area Network (SAN). In other embodiments, hardware forensics manager 145 and/or a hardware triage manager 180 may be part of computing system 105, or may be separate. If separate, hardware forensics manager 145 and/or a hardware triage manager 180, and computing system 105 may be communicatively coupled via network 620. In one embodiment, all or a portion of one or more of the disclosed embodiments may be encoded as a computer program and loaded onto and executed by computing devices 105(1)-(N) and/or forensics and triage system 605, or any combination thereof. All or a portion of one or more of the embodiments disclosed herein may also be encoded as a computer program, stored on computing devices 105(1)-(N) and/or forensics and triage system 605, and distributed over network 620. In some examples, all or a portion of computing devices 105(1)-(N) and/or forensics and triage system 605 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. In addition, one or more of the components described herein may transform data, physical devices, and/or representations of physical devices from one form to another. For example, hardware forensics manager 145 and/or a hardware triage manager 180 may transform the behavior of computing systems 105(1)-(N) and/or forensics and triage system 605 to embed forensic and triage data in memory dumps.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
   detecting that a firmware interface is writing memory dump data to kernel memory of a computing system;
   based on the detecting, activating an operating mode of an operating system executing on the computing system;
   generating hardware forensic data by reading local computer bus data, firmware event log data, and memory mapped input/output (I/O) data associated with the computing system; and
   storing the hardware forensic data in a memory location of the kernel memory causing the hardware forensic data to be included in the memory dump data.

2. The computer-implemented method of claim 1, wherein
   the firmware interface is a Unified Extensible Firmware Interface (UEFI),
   the operating mode is a System Management Mode (SMM),
   the local computer bus data is associated with a Peripheral Component Interconnect (PCI) of the computing system, and
   the firmware event log is a Basic Input/Output System (BIOS) log.

3. The computer-implemented method of claim 2, further comprising:
   generating thermal data comprising a current temperature of one or more thermistors in the computing system; and
   generating Non-Volatile Random Access Memory (NVRAM) data comprising a last configuration created by a memory reference code.

4. The computer-implemented method of claim 3, wherein
   the local computer bus data comprises one or more Peripheral Component Interconnect Express (PCIE) registers for one or more PCIE bridges of the computing system and indicates whether one or more PCI devices have gone offline, and
   the memory mapped I/O data comprises information associated with one or more storage controllers and one or more Universal Serial Bus (USB) devices of the computing system and indicates whether the one or more storage controllers or the one or more USB devices have gone offline or into an error state.

5. The computer-implemented method of claim 4, further comprising:
   parsing the hardware forensic data prior to causing the inclusion of the hardware forensic data in the memory dump data, wherein the parsing comprises:
   determining whether a machine check is active,
   determining whether a boot device went offline,
   determining whether a PCIE bridge of the one or more PCIE bridges has an error or has gone offline,
   determining whether a storage controller of the one or more storage controllers or a USB device of the one or more USB devices is in an errant state, and
   determining whether a thermal sensor is at or within a threshold of a critical level.

6. The computer-implemented method of claim 5, further comprising:
   based on the parsing, generating hardware triage data; and
   storing the hardware triage data in the memory location along with the hardware forensic data for inclusion in the memory dump data.

7. The computer-implemented method of claim 6, wherein
   detecting that the firmware interface is writing the memory dump data to the kernel memory comprises determining whether an NVRAM variable associated with a kernel debugger is being written to, and
   calling a software System Management Interrupt (SMI) associated with the SMM to write the hardware triage data and the hardware forensic data to an Advanced Configuration and Power Interface (ACPI) memory structure in the kernel memory.

8. A non-transitory computer readable storage medium comprising program instructions executable to:
    detect that a firmware interface is writing memory dump data to kernel memory of a computing system;
    based on the detecting, activate an operating mode of an operating system executing on the computing system;
    generate hardware forensic data by reading local computer bus data, firmware event log data, and memory mapped input/output (I/O) data associated with the computing system; and
    store the hardware forensic data in a memory location of the kernel memory causing the hardware forensic data to be included in the memory dump data.

9. The non-transitory computer readable storage medium of claim 8, wherein
    the firmware interface is a Unified Extensible Firmware Interface (UEFI),
    the operating mode is a System Management Mode (SMM),
    the local computer bus data is associated with a Peripheral Component Interconnect (PCI) of the computing system, and
    the firmware event log is a Basic Input/Output System (BIOS) log.

10. The non-transitory computer readable storage medium of claim 9, further comprising:
    generating thermal data comprising a current temperature of one or more thermistors in the computing system; and
    generating Non-Volatile Random Access Memory (NVRAM) data comprising a last configuration created by a memory reference code.

11. The non-transitory computer readable storage medium of claim 10, wherein
    the local computer bus data comprises one or more Peripheral Component Interconnect Express (PCIE) registers for one or more PCIE bridges of the computing system and indicates whether one or more PCI devices have gone offline, and
    the memory mapped I/O data comprises information associated with one or more storage controllers and one or more Universal Serial Bus (USB) devices of the computing system and indicates whether the one or more storage controllers or the one or more USB devices have gone offline or into an error state.

12. The non-transitory computer readable storage medium of claim 11, further comprising:
    parsing the hardware forensic data prior to causing the inclusion of the hardware forensic data in the memory dump data, wherein the parsing comprises:
        determining whether a machine check is active,
        determining whether a boot device went offline,
        determining whether a PCIE bridge of the one or more PCIE bridges has an error or has gone offline,
        determining whether a storage controller of the one or more storage controllers or a USB device of the one or more USB devices is in an errant state, and
        determining whether a thermal sensor is at or within a threshold of a critical level.

13. The non-transitory computer readable storage medium of claim 12, further comprising:
    based on the parsing, generating hardware triage data; and
    storing the hardware triage data in the memory location along with the hardware forensic data for inclusion in the memory dump data.

14. The non-transitory computer readable storage medium of claim 13, wherein
    detecting that the firmware interface is writing the memory dump data to the kernel memory comprises determining whether an NVRAM variable associated with a kernel debugger is being written to, and
    calling a software System Management Interrupt (SMI) associated with the SMM to write the hardware triage data and the hardware forensic data to an Advanced Configuration and Power Interface (ACPI) memory structure in the kernel memory.

15. A system comprising:
one or more processors; and
a memory coupled to the one or more processors, wherein the memory stores program instructions executable by the one or more processors to:
    detect that a firmware interface is writing memory dump data to kernel memory of a computing system;
    based on the detecting, activate an operating mode of an operating system executing on the computing system;
    generate hardware forensic data by reading local computer bus data, firmware event log data, and memory mapped input/output (I/O) data associated with the computing system; and
    store the hardware forensic data in a memory location of the kernel memory causing the hardware forensic data to be included in the memory dump data.

16. The system of claim 15, wherein
the firmware interface is a Unified Extensible Firmware Interface (UEFI),
the operating mode is a System Management Mode (SMM),
the local computer bus data is associated with a Peripheral Component Interconnect (PCI) of the computing system, and
the firmware event log is a Basic Input/Output System (BIOS) log.

17. The system of claim 16, further comprising:
generating thermal data comprising a current temperature of one or more thermistors in the computing system; and
generating Non-Volatile Random Access Memory (NVRAM) data comprising a last configuration created by a memory reference code.

18. The system of claim 17, wherein
the local computer bus data comprises one or more Peripheral Component Interconnect Express (PCIE) registers for one or more PCIE bridges of the computing system and indicates whether one or more PCI devices have gone offline, and
the memory mapped I/O data comprises information associated with one or more storage controllers and one or more Universal Serial Bus (USB) devices of the computing system and indicates whether the one or more storage controllers or the one or more USB devices have gone offline or into an error state.

19. The system of claim 18, further comprising:
parsing the hardware forensic data prior to causing the inclusion of the hardware forensic data in the memory dump data, wherein the parsing comprises:
    determining whether a machine check is active,
    determining whether a boot device went offline,
    determining whether a PCIE bridge of the one or more PCIE bridges has an error or has gone offline, determining whether a storage controller of the one or more storage controllers or a USB device of the one or more USB devices is in an errant state, and determining whether a thermal sensor is at or within a threshold of a critical level;

based on the parsing, generating hardware triage data; and storing the hardware triage data in the memory location along with the hardware forensic data for inclusion in the memory dump data.

20. The system of claim 19, wherein detecting that the firmware interface is writing the memory dump data to the kernel memory comprises determining whether an NVRAM variable associated with a kernel debugger is being written to, and calling a software System Management Interrupt (SMI) associated with the SMM to write the hardware triage data and the hardware forensic data to an Advanced Configuration and Power Interface (ACPI) memory structure in the kernel memory.

* * * * *